United States Patent [19]
Baier

[11] Patent Number: 5,251,237
[45] Date of Patent: Oct. 5, 1993

[54] RECEIVER FOR A DIGITAL TRANSMISSION SYSTEM

[75] Inventor: Alfred Baier, Eckental, Fed. Rep. of Germany

[73] Assignee: U.S. Philips Corporation, New York, N.Y.

[21] Appl. No.: 828,531

[22] Filed: Jan. 24, 1992

[30] Foreign Application Priority Data

Jan. 25, 1991 [DE] Fed. Rep. of Germany ....... 4102151

[51] Int. Cl.$^5$ .................. H03D 1/04; H03H 7/30; H04L 27/14
[52] U.S. Cl. ........................ 375/99; 375/11; 375/80
[58] Field of Search .............. 375/80, 99, 11, 12, 375/10; 455/343, 65, 303; 328/164

[56] References Cited

U.S. PATENT DOCUMENTS

| | | | |
|---|---|---|---|
| 4,389,616 | 6/1983 | Glockler et al. | 375/99 |
| 4,672,638 | 6/1987 | Taguchi et al. | 375/99 |
| 4,709,376 | 11/1987 | Kage | 375/99 |
| 4,920,543 | 4/1990 | Martin | 375/10 |
| 5,023,940 | 6/1991 | Johnson et al. | 455/343 |
| 5,054,035 | 10/1991 | Tarallo et al. | 375/10 |
| 5,058,203 | 10/1991 | Inagami | 455/343 |
| 5,095,494 | 3/1992 | Takahashi et al. | 375/10 |

FOREIGN PATENT DOCUMENTS 0249116 12/1988 European Pat. Off. .
2-199936 8/1990 Japan .

OTHER PUBLICATIONS

G. David Forney, Jr., The Viterbi Algorithm, Mar. 1973, IEEE, vol. 61, No. 3.
F. G. Proakis, Digital Communications, "An Adaptive Channel Estimator", pp. 410–411.

*Primary Examiner*—Curtis Kuntz
*Assistant Examiner*—Vijay Shankar
*Attorney, Agent, or Firm*—David R. Treacy

[57] ABSTRACT

A digital data receiver is enabled to operate with good error correction of signals subject to high multi-path distortion, and to operate with lower power consumption as the incoming signal dispersion becomes less. A signal analyzer measures the quality of the received signal. The amount of error correction is then adjusted in accordance with the quality factor. An equalizer may be used having an adjustable number of filter stages, or a state model of the transmission channel may be used with controllable numbers of states, channel coefficients, data paths, or register lengths for storing path data.

20 Claims, 2 Drawing Sheets

RECEIVER FOR A DIGITAL TRANSMISSION SYSTEM

BACKGROUND OF THE INVENTION

The invention relates to a receiver for a digital transmission system comprising an incoming arrangement for receiving a receive signal and including a signal processing means for recovering a transmitted data sequence from the received signal.

Receivers of this type are used, for example, in the future Pan-European mobile radio system GSM (Groupe Special Mobile), which is referenced D-network in Germany. In this mobile radio system, for example, speech signals are transmitted in digitized form together with other digital signals according to a Time-Division Multiple Access method (TDMA). The data are transmitted by a transmitter of the mobile radio system by means of a suitable modulation. Reflections and multipath propagation on the transmission path cause the transmitted signal to reach the receiver in various superposed signal portions with different delays and phase shifts so that the incoming signal is distorted. These distortions cause the binary digits contained in the received signal to be affected by preceding binary digits (intersymbol interference). A signal processing means comprising an equalizer eliminating these distortions is necessary for equalizing the originally transmitted data symbols.

JP 2-199936 (A) discloses a digital transceiver in which, for improving the transmission efficiency, the receiver comprises a device for determining the transmission quality that is, the amount of noise and distortion, as contrasted with the magnitude of the incoming signal. When there is a good transmission quality, this device applies a switching signal to an error correction means arranged at the transmitter and receiver ends, so that the error correction means is switched off.

SUMMARY OF THE INVENTION

It is an object of the invention to provide a receiver of the type mentioned in the opening paragraph, which has little signal processing circuitry and little power consumption.

This object is achieved with a receiver of the type mentioned in the opening paragraph, in that the output of the receiver arrangement is connected to a signal analysis means which determines a factor for the receiver quality of the received signal, and in that the signal analysis means controls, in dependence on the established receive quality, the processing circuitry of the signal processing means for recovering a data sequence from the received signal.

The invention is based on the recognition that the necessary signal processing circuitry in receivers for digital data signals through dispersive radio channels that vary with time depends on the receive quality i.e. especially on the degree of dispersion of the radio channel. Put in other words, when the radio channel presents much dispersion, more signal processing circuitry is necessary than in the case of little dispersion. For example, the length of the instantaneous channel impulse response is then used as a measure of dispersion of the radio channel. To reduce the signal processing circuitry and thus also to minimize the power consumption, the receive quality is determined, for example, at regular intervals by the signal analysis means and the complexity and thus the performance efficiency of the signal processing in the receiver is continuously adjusted to the actual receive quality. This is very important, especially in battery-operated receivers, for example, so-called handhelds. The operating time possible with such a battery-operated handheld is appreciably extended by the minimization of the power consumption without the receive quality being diminished.

In an embodiment of the invention, the dispersion of each transmission channel is determined in the signal analysis means, and the signal processing circuitry of the signal processing means for recovering the transmitted data sequence is controlled by the signal analysis means in dependence on the dispersion of each transmission channel. All this avoids the previous disadvantage that in receivers of this type the signal processing circuitry and thus also the power consumption result from a "worst case operation" and are thus invariably high even when there is currently a considerably more favourable operation i.e. a considerably smaller dispersion of the transmission channel. In a receiver according to the invention, on the other hand, a channel-adaptive minimization of the power consumption of the receiver is obtained. In a mobile radio receiver this leads to the fact that the power consumption of the receiver when operated in a municipal area where the mobile radio channel presents far less dispersion, is smaller than when the receiver is operated in a hilly environment with a strongly dispersive multipath reception.

In a further embodiment of the invention, the signal analysis means and the control of the signal processing means operate in blocks in accordance with a block structure of the received signal defined by frames and/or time slots. The time frame defined by the received signal is also used for the regular processing of the received signal in the signal analysis means, so that an additional time control of this processing is not necessary.

In an embodiment of the invention, the signal processing means implements a signal processing alogrithm whose complexity and performance efficiency are determined by at least one parameter that can be adjusted by the signal analysis means. The variation of the parameter(s) makes thus a simple adaptation possible of the signal processing means to any operating condition.

In an embodiment of the invention, the signal processing means comprises an equalizer having a filter structure, in which the number of filter stages may be adjusted in accordance with the receive quality of the received signal. For example, if a linear equalizer is used, or a decision feedback equalizer with a transversal filter or a lattice filter structure, the signal analysis means may adjust the number of filter stages in the forward and/or backward branch in dependence on the channel.

In a further embodiment of the invention, the signal processing means comprises an equalizer based on a state model of the transmission channel, in which the number of states of the state model and/or the number of the considered channel coefficients for computing the metric and/or the number of considered data paths and/or the length of the registers for storing the paths can be adjusted by the signal analysis means. For example, if an optimum or sub-optimum equalizer according to the principle of maximum likelihood sequence estimation or sequential decoding is implemented in the signal processing means, a variation of the parameters of "number of states", "number of considered channel coefficients for computing the metric", "number of followed data paths" and "length of the registers for storing the followed data paths" may produce a simple channel-dependent adjustment of the signal processing means.

In a further embodiment of the invention, the signal analysis means comprises an estimator for estimating the instantaneous impulse response of the transmission channel and an analyzer for establishing the receive quality. For this purpose, the input of the estimator is connected to the output of the receiver arrangement and the output of the estimator to the input of the analyzer, which analyzer determines the degree of dispersion of the transmission channel and accordingly controls the signal processing means.

In a further embodiment of the invention, an adaptive filter and/or an arrangement for determining the autocorrelation function of the estimated channel impulse response are inserted between the estimator and the analyzer. The filter is, for example, a matched filter matched to the estimated channel impulse response or a whitened matched filter, as described, for example, in the title of "Digital Transmission" by John G. Proakis, 1983. If the signal analysis means comprises an arrangement for determining the autocorrelation function of the estimated channel impulse response, the equalizer used in the receiver is based, for example, on the Viterbi algorithm as described, for example in European Patent application EP 0 294 116 A2. The Viterbi method as such is described, for example, in the paper entitled "The Viterbi Algorithm", by G. David Forney J. R., Proceedings of the IEEE, Vol. 61, No. 3, March 1973.

In a further embodiment of the invention, for determining the parameters of the signal processing means on the basis of the squared values of the estimated channel impulse responses of a predeterminable time-dependent measuring window, which is longer than the maximum length that can be expected of the channel impulse response, a middle range of the measuring window is determined in which the squared values exceed a predeterminable threshold, while the middle range of the measuring window characterizes the length of the channel impulse response which determines the parameters. By omitting the values lying below the predeterminable threshold, the length of the impulse response is determined as a factor for the degree of dispersion of the radio channel and the parameters of the signal processing means and thus the signal processing circuitry are determined with the aid of, for example, an allocated Table.

In an embodiment of the invention, for determining the parameters of the signal processing means, all the squared values of the estimated channel impulse responses of a predeterminable measuring window, which is longer than the maximum length that can be expected of the channel impulse response, are added together to form a total energy value, while only a middle range without the boundary ranges of the measuring window, whose boundary energy portions of the total energy lie below a predeterminable threshold, characterizes the length of the channel impulse response which determines the parameters. By adding the squared values of the estimated channel impulse responses together, the total energy of the channel impulse response is found. Only a predeterminable middle range of this total energy is taken into consideration for determining the parameters, which middle range is to comprise a specific minimum energy. From the length of the channel impulse response thus produced and, for example, from a table, the parameters characterizing the signal processing circuitry of the signal processing means may be determined.

The invention will be further explained with reference to the exemplary embodiments shown in the drawing.

DESCRIPTION OF THE PREFERRED EMBODIMENT

Figure 1:
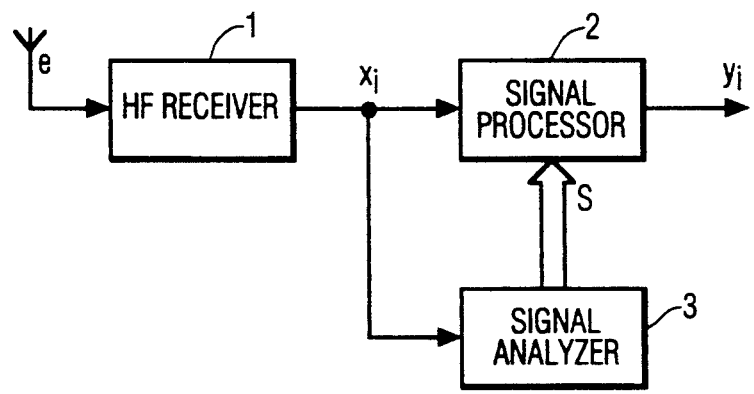
FIG. 1 shows a block diagram of a receiver for a digital transmission system.

In the block diagram of an incoming represented in FIG. 1, a receive signal e is applied to a receiver arrangement 1 which comprises, for example, a HF receive section, a sample-and-hold circuit, an analog-to-digital converter and a memory. At the output of the receiver arrangement 1 a received signal $x_i$ is available which is applied to a signal processing means 2 and also to a signal analysis means 3. The signal analysis means 3 produces a control signal S controlling the signal processing means 2. At the output of the signal processing means 2 an output signal $y_i$ is available.

The receiver represented in FIG. 1 is, for example, a mobile radio receiver for the GSM system. The transmission channel strongly varying with time and the linked degree of dispersion are potentially subject to very strong fluctuations over time and depend on operating conditions or locations of the radio transmitter and receiver which are not known in advance. The radio receiver represented in FIG. 1 may be arranged for such operating conditions according to the most disadvantageous operating condition to be expected as regards dispersion or according to a predetermined specification of a worst case operating condition. Accordingly, the signal processing means 2 comprises an equalizer as described, for example, in DE-A 39 11 999 for a digital transmission system. The equalizer described there operates under any operating condition always with the same complexity and performance efficiency. In contradiction thereof, the signal processing means 2 represented in FIG. 1 comprises, for example, an equalizer whose complexity and performance efficiency are determined by one or more parameters. For this purpose, the signal $x_i$ is evaluated by the signal analysis means 3 and a factor for the receive quality of the received signal is determined i.e. the degree of dispersion of the radio channel or the degree of distortion or intersymbol interference in the received signal, as contrasted with the simple magnitude of the incoming signal, is determined. In accordance with the determined receive quality of the received signal, the equalizer included in the signal processing means 2 and its parameter are activated by means of the control signal S. This makes it possible that a mobile radio receiver, arranged for the most disadvantageous operating condition of a strongly dispersive multipath radio channel in a hilly environment, can be operated in a municipal area with less dispersion of the radio channel which has a smaller performance efficiency of the signal analysis means, without the transmission quality being adversely affected. Especially with battery-operated receivers, for example, with mobile telephones and/or handhelds, a minimization of the power consumption is achieved. This extends the operating time of such devices and thus also increases their availability.

Figure 2:
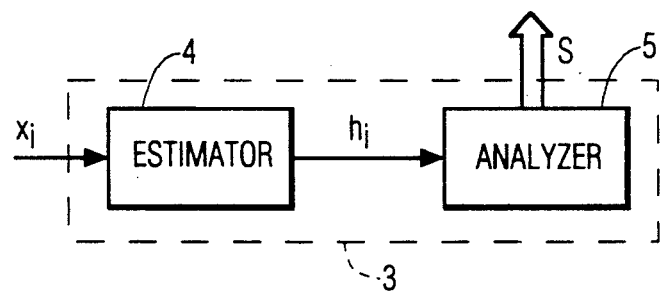
FIG. 2 shows a block diagram of a signal analysis means.

FIG. 2 shows a block diagram of a signal analysis means 3, as it can be used, for example, in a transmission system represented in FIG. 1. The signal analysis means 3 is constituted by an estimator 4 for estimating the instantaneous channel impulse response and by an analyzer 5 following in the circuit. The analyzer 5 forms the length of the channel impulse response on the basis of a signal $h_i$ at the output of the estimator 4 and produces herefrom the control signal S for controlling the signal processing means 2 (FIG. 1).

The length of the instantaneous estimated impulse response is the factor for the dispersion of the radio channel. With a rather small length of the channel impulse response, the signal processing circuitry may be reduced, whereas with a rather long channel impulse response a larger signal processing circuitry is necessary for ensuring a sufficient receive quality. In that case the estimator 4 as well as the analyzer 5 of the signal analysis means 3 as well as the signal processing means 2 operate block-by-block according to a block structure of the received signal defined by frames and/or time slots. Thus, an additional time control of this processing means may be omitted. With the aid of the signal analysis means 3 the degree of dispersion of the radio channel is constantly determined and the complexity and the performance efficiency of the signal processing in the receiver is also constantly matched to the current degree of dispersion. This leads to a channel-adaptive minimization of the signal processing circuitry in the signal processing means 2 (FIG. 1) and thus also to a minimization of the power consumption of the receiver formed by the receiver arrangement 1 as well as the signal processing means 2.

Figure 3:
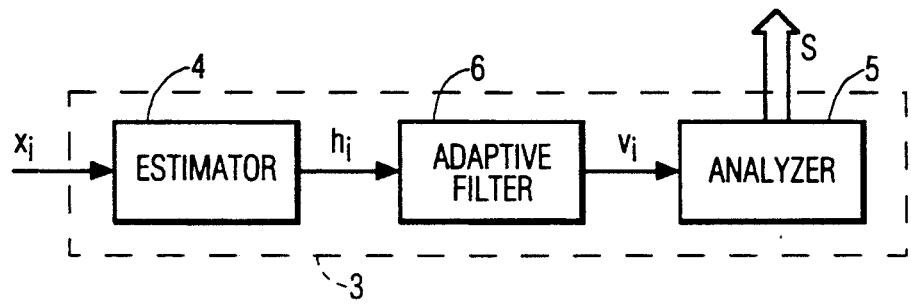
FIG. 3 shows a further exemplary embodiment of a signal analysis means.

FIG. 3 shows the block diagram of a signal analysis means 3 comprising an adaptive filter 6 inserted between an estimator 4 and an analyzer 5. With the aid of the adaptive filter 6 the autocorrelation function of the channel impulse response of the receiver represented in FIG. 1 may be determined. In such an embodiment of the invention first the autocorrelation function may be determined which finally determines the signal processing circuitry of the signal processing means 2.

Figure 4:
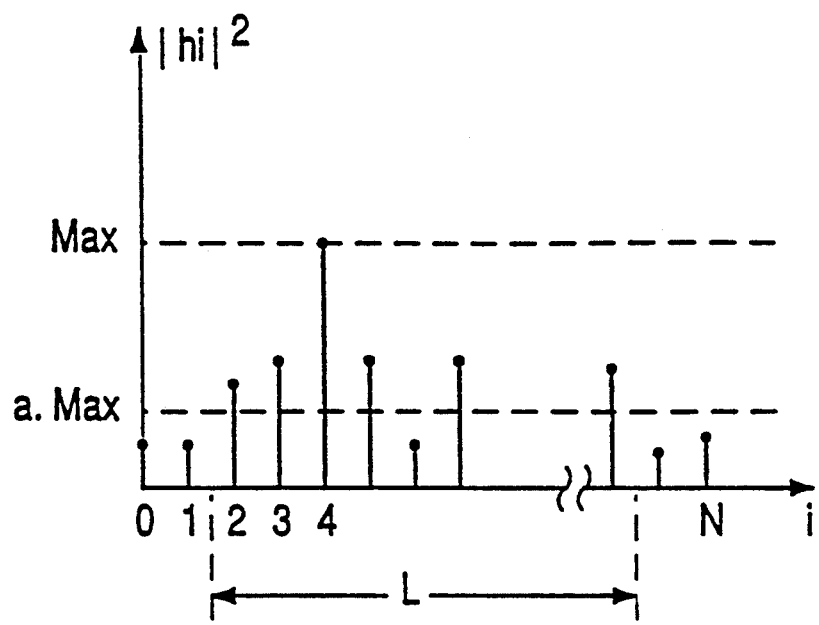
FIGS. 4 and 5 show each an example of an evaluation of channel impulse responses.

FIG. 4 shows discrete values of the squared values $/h_i/^2$ of the estimated channel impulse responses at discrete instants $i=0,1,\ldots,N$. The maximum of the squared values of the estimated channel impulse response is denoted by the dashed line Max. The likewise dashed line a.Max denotes a predeterminable threshold, where a is a predeterminable constant with $0<a<1$. The length L of the impulse response may be determined on the basis of all the squared values.

In a first step the squared values $/h_i/^2$ are determined first for discrete values $i=0,\ldots,N$ on the basis of the signal $h_i$ which is produced by the estimator 4 represented in FIG. 2. In a second step the maximum Max as well as the predeterminable threshold a.Max are determined on the basis of all the values of these squared values, where $0<a<1$. In a third step all the values smaller than the predeterminable threshold a.Max are determined on the basis of all the squared values in the right and left bands of the measuring window ranging from $i=0,\ldots,N$. The "remainder" i.e. the remaining middle range of the measuring window determines the length L of the impulse response. As already observed with respect to FIGS. 1 to 3, the length L of the channel impulse response determined in this manner may be used as a basis for the parameter(s) for the channel processing means 2 (FIG. 1). This may be performed on the basis of a Table stored in the analyzer 5 (FIGS. 2 and 3), which produces different parameters in the form of the control signal S (FIGS. 1 to 3) for different values of the channel impulse response length L.

Figure 5:
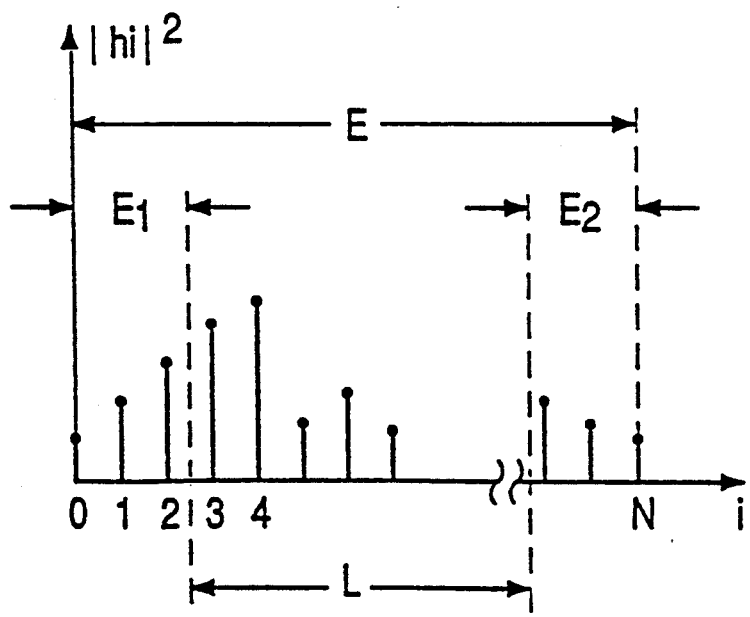

In the exemplary embodiment of the invention shown in FIG. 5 for evaluation of channel impulse responses, the references already described with respect to FIG. 4 are used in essence. For determining the channel impulse response length L, for the example represented in FIG. 5, first the squared value $/h_i/$ for $i=0,\ldots,N$ is determined in accordance with the embodiment shown in FIG. 4. By adding the squared values together, the total energy E of the channel impulse response is determined. The measuring window determined by all the squared values $/h_i/^2$ only takes into consideration a predeterminable middle range, worded differently: the boundary energy portions referenced $E_1$, $E_2$ in FIG. 5 are not taken into consideration. Each boundary energy is then, for example, 5% of the total energy E. The length of the middle range of the channel impulse response, resulting from the omission of the boundary ranges having the boundary energy portions $E_1$, $E_2$, determines the length L of the channel impulse response. The parameters for controlling the signal processing means 2 (FIG. 1) are determined in accordance with the exemplary embodiment described with respect to FIG. 5, for example, with the aid of a table.

I claim:

1. A receiver for a digital transmission system, comprising means for receiving an incoming signal, and providing as an output a received signal, and signal processing means, comprising processing circuitry, for receiving said received signal and recovering a transmitted data sequence from said received signal, characterized in that the receiver further comprises signal analysis means for determining a quality factor for said received signal different from the magnitude of said incoming signal being received by said means for receiving, and means, responsive to the determined quality factor being higher than a given value, for controlling said processing circuitry to provide error correction while reducing power consumption of the receiver.

2. A receiver as claimed in claim 1, characterized in that said signal processing means implements a signal processing algorithm having a complexity and performance efficiency determined by at least one parameter, and said means for controlling adjusts at least one said parameter responsive to the quality factor determined by said signal analysis means.

3. A receiver as claimed in claim 2, characterized in that said processing circuitry comprises an equalizer having a filter structure having a plurality of filter stages, and said one parameter is the number of said filter stages in said filter structure.

4. A receiver as claimed in claim 2, characterized in that said processing means comprises an equalizer based on a state model of the transmission channel over which said incoming signal is received, said model having a number of states and being defined by a number of channel coefficients for computing a metric, a number of data paths, and a plurality of registers for storing data paths, each register having a length equal to a number, and said one parameter is one of said numbers.

5. A receiver as claimed in claim 1, characterized in that said signal analysis means and said signal processing means operate in blocks in accordance with a block structure of the received signal defined by frames and/or time slots.

6. A receiver as claimed in claim 5, characterized in that said signal processing means implements a signal processing algorithm having a complexity and performance efficiency determined by at least one parameter, and said means for controlling adjusts at least one said parameter responsive to the quality factor determined by said signal analysis means.

7. A receiver as claimed in claim 5, characterized in that said processing circuitry comprises an equalizer having a filter structure having a plurality of filter stages, and said one parameter is the number of said filter stages in said filter structure.

8. A receiver as claimed in claim 5, characterized in that said processing means comprises an equalizer based on a state model of the transmission channel over which said incoming signal is received, said model having a number of states and being defined by a number of channel coefficients for computing a metric, a number of data paths, and a plurality of registers for storing data paths, each register having a length equal to a number, and said one parameter is one of said numbers.

9. A receiver for a digital transmission system, comprising means for receiving an incoming signal over at least one channel, and providing as an output a received signal, and signal processing means, comprising processing circuitry, for receiving said received signal and recovering a transmitted data sequence from said received signal, characterized in that the receiver further comprises signal analysis means for determining the dispersion of each transmission channel, and means, responsive to the dispersion determined by said signal analysis means, for controlling said processing circuitry to provide error correction while reducing power consumption of the receiver.

10. A receiver as claimed in claim 9, characterized in that said signal analysis means and said signal processing means operate in blocks in accordance with a block structure of the received signal defined by frames and/or time slots.

11. A receiver as claimed in claim 10, characterized in that said signal analysis means comprises an estimator for estimating the instantaneous impulse response of the transmission channel over which the incoming signal is being received, and said means for controlling includes an analyzer.

12. A receiver as claimed in claim 11, comprising means for determining the autocorrelation function of the estimated channel impulse response estimated by said estimator, and supplying said function to said analyzer.

13. A receiver as claimed in claim 10, characterized in that said means for determining the dispersion comprises means for determining squared values of the estimated channel impulse responses of a predetermined time-dependent window, said window being longer than the maximum length that can be expected for the channel impulse response, and means for determining a middle range of the measuring window in which said squared values exceed a predetermined threshold, said middle range characterizing the length of the channel impulse response.

14. A receiver as claimed in claim 10, characterized in that said means for determining the dispersion comprises means for determining squared values of the estimated channel impulse responses of a predetermined time-dependent window, said window being longer than the maximum length that can be expected for the channel impulse response, means for adding said squared values to form a total energy value, and means for determining a middle range of the measuring window, which excludes boundary ranges, wherein the portions of the total energy corresponding to said boundary ranges are less than a predetermined threshold, said middle range characterizing the length of the channel impulse response.

15. A receiver as claimed in claim 9, characterized in that said means for controlling includes an analyzer, said signal analysis means comprises an estimator for estimating the instantaneous impulse response of the transmission channel over which the incoming signal is being received, and means for determining the autocorrelation function of the estimated channel impulse response estimated by said estimator, and supplying said function to said analyzer.

16. A receiver for a digital transmission system, comprising means for receiving an incoming signal, and providing as an output a received signal, and signal processing means, comprising processing circuitry, for receiving said received signal and recovering a transmitted data sequence from said received signal, characterized in that said signal processing means implements a signal processing algorithm having a complexity and performance efficiency determined by at least one parameter, and the receiver further comprises signal analysis means for determining a quality factor for said received signal different from the magnitude of said incoming signal being received by said means for receiving, and means for adjusting at least one said parameter responsive to the quality factor determined by said signal analysis means, to provide error correction while reducing power consumption of the receiver.

17. A receiver as claimed in claim 16, characterized in that said processing circuitry comprises an equalizer having a filter structure having a plurality of filter stages, and said one parameter is the number of said filter stages in said filter structure.

18. A receiver as claimed in claim 16, characterized in that said processing means comprises an equalizer based on a state model of the transmission channel over which said incoming signal is received, said model having a number of states and being defined by a number of channel coefficients for computing a metric, a number of data paths, and a plurality of registers for storing data paths, each register having a length equal to a number, and said one parameter is one of said numbers.

19. A receiver as claimed in claim 16, characterized in that said means for determining the dispersion comprises means for determining squared values of the estimated channel impulse responses of a predetermined time-dependent window, said window being longer than the maximum length that can be expected for the channel impulse response, and means for determining a middle range of the measuring window in which said squared values exceed a predetermined threshold, said middle range characterizing the length of the channel impulse response and determining the value of said parameter.

20. A receiver as claimed in claim 16, characterized in that said means for determining the dispersion comprises means for determining squared values of the estimated channel impulse responses of a predetermined time-dependent window, said window being longer than the maximum length that can be expected for the channel impulse response, means for adding said squared values to form a total energy value, and means for determining a middle range of the measuring window, which excludes boundary ranges, wherein the portions of the total energy corresponding to said boundary ranges are less than a predetermined threshold, said middle range characterizing the length of the channel impulse response and determining the value of said parameter.

* * * * *